US010213732B2

(12) United States Patent
Spiry et al.

(10) Patent No.: US 10,213,732 B2
(45) Date of Patent: Feb. 26, 2019

(54) SYSTEM AND METHOD FOR TREATMENT OF A FLUE GAS

(71) Applicant: General Electric Company, Schenectady, NY (US)

(72) Inventors: Irina Pavlovna Spiry, Gloversville, NY (US); Benjamin Rue Wood, Niskayuna, NY (US); Surinder Prabhjot Singh, Niskayuna, NY (US); Robert James Perry, Niskayuna, NY (US); John Brian McDermott, Rexford, NY (US)

(73) Assignee: GENERAL ELECTRIC COMPANY, Schenectaty, NY (US)

( * ) Notice: Subject to any disclaimer, the term of this patent is extended or adjusted under 35 U.S.C. 154(b) by 0 days.

(21) Appl. No.: 15/676,149

(22) Filed: Aug. 14, 2017

(65) Prior Publication Data
US 2017/0341016 A1 Nov. 30, 2017

Related U.S. Application Data

(62) Division of application No. 14/567,319, filed on Dec. 11, 2014, now Pat. No. 9,764,274.

(51) Int. Cl.
*B01D 53/96* (2006.01)
*B01D 53/14* (2006.01)
*B01D 53/62* (2006.01)
*B01D 53/78* (2006.01)

(52) U.S. Cl.
CPC ...... *B01D 53/1475* (2013.01); *B01D 53/1425* (2013.01); *B01D 53/62* (2013.01); *B01D 53/96* (2013.01); *B01D 2252/2026* (2013.01); *B01D 2252/2053* (2013.01); *B01D 2252/20489* (2013.01); *B01D 2257/504* (2013.01); *B01D 2258/0283* (2013.01); *Y02C 10/06* (2013.01)

(58) Field of Classification Search
None
See application file for complete search history.

(56) References Cited

U.S. PATENT DOCUMENTS

| 2011/0100217 A1* | 5/2011 | Soloveichik | B01D 53/1475 95/179 |
| 2013/0177489 A1* | 7/2013 | Dube | B01D 53/62 423/220 |
| 2018/0001259 A1* | 1/2018 | Singh | B01D 53/78 |

* cited by examiner

*Primary Examiner* — Daniel Berns
(74) *Attorney, Agent, or Firm* — GE Global Patent Operation

(57) ABSTRACT

A method for treatment of a flue gas involves feeding the flue gas and a lean solvent to an absorber. The method further involves reacting the flue gas with the lean solvent within the absorber to generate a clean flue gas and a rich solvent. The method also involves feeding the clean flue gas from the absorber and water from a source, to a wash tower to separate a stripped portion of the lean solvent from the clean flue gas to generate a washed clean flue gas and a mixture of the water and the stripped portion of the lean solvent. The method further involves treating at least a portion of the mixture of the water and the stripped portion of the lean solvent via a separation system to separate the water from the stripped portion of the lean solvent.

8 Claims, 2 Drawing Sheets

SYSTEM AND METHOD FOR TREATMENT OF A FLUE GAS

STATEMENT REGARDING FEDERALLY SPONSORED RESEARCH AND DEVELOPMENT

Figure 1:
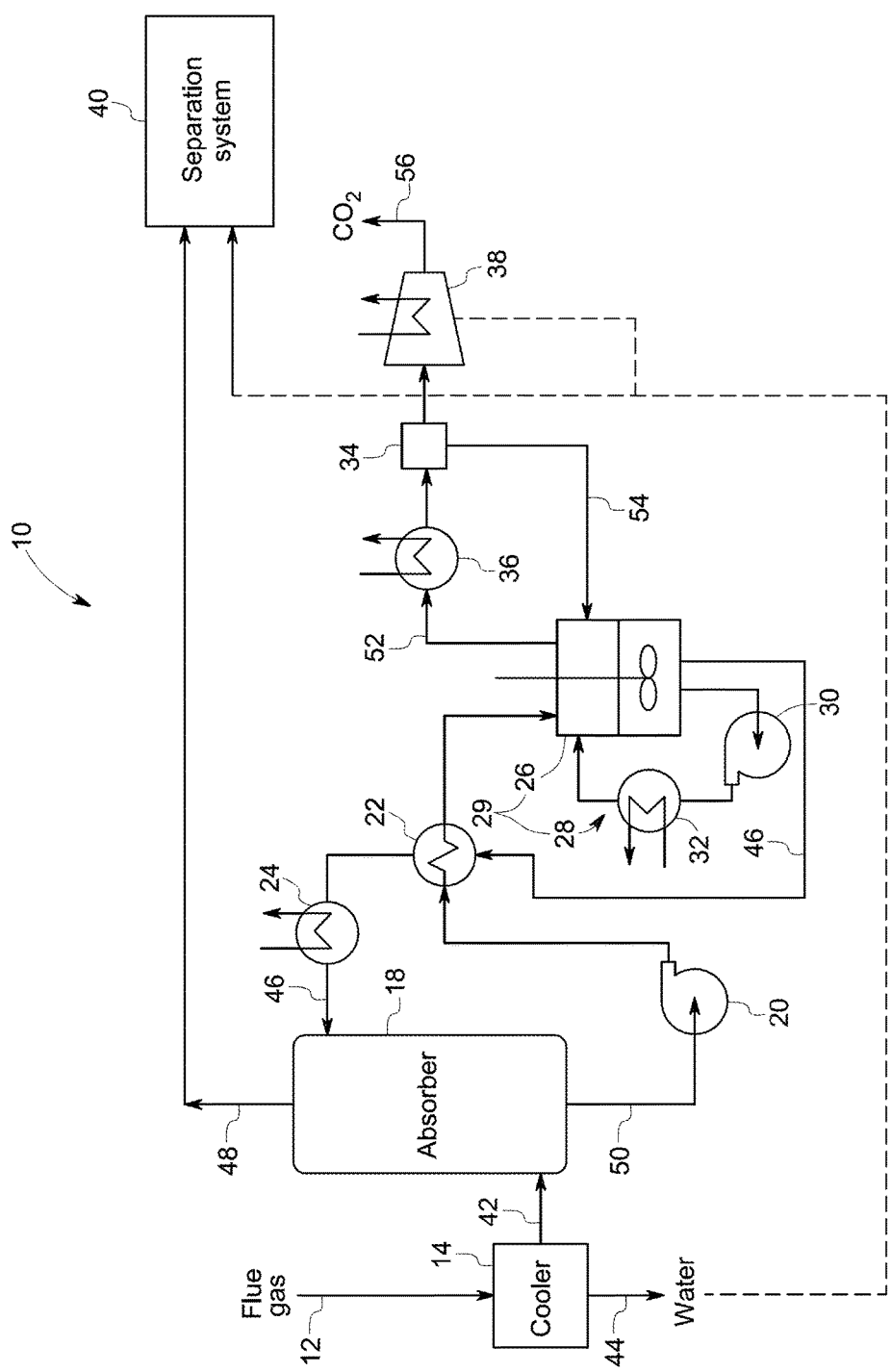

This invention was made with Government support under contract number DE-FE0013755 awarded by the Department of Energy (DOE). The Government has certain rights in this invention.

BACKGROUND

The invention relates generally to gas treatment systems, and more particularly to a system and a method for treatment of a post combustion flue gas.

In combustion-based systems such as a power plant, for example, a flue gas is produced when coal or other types of fuel are burned in air. The heat released by combustion generates steam, which drives a turbine generator for producing electric power. Hot combustion gases exiting the boiler include nitrogen and smaller concentrations of water vapor and carbon dioxide. Other constituents, formed from impurities in coal, include sulfur dioxide, nitrogen oxides, and particulate matter (fly ash). Such pollutants must be removed to meet environmental standards.

One effective method to remove carbon dioxide from the flue gas is by chemical reaction with a liquid solvent because the flue gas is at atmospheric pressure and the concentration of carbon dioxide is low (typically around 12-15% by volume for coal plants, for example). The most commonly used solvents are a family of organic amines, a subclass for example, are amino silicones. The flue gas is "scrubbed" with an amine solution, inside a vessel referred to as an absorber, typically capturing a higher percentage of the carbon dioxide. The carbon dioxide-laden solvent is then pumped to another vessel, referred to as a regenerator, where heat releases the carbon dioxide as a gas. The resulting concentrated carbon dioxide gas stream is then compressed into a supercritical fluid for transport and the solvent is recycled.

Amino silicone, for example, is an expensive solvent. The drawbacks associated with conventional treatment systems are that there is a substantial loss of the amino silicone solvent along with the clean flue gas exiting the absorber.

There is a need for an enhanced system and method for treatment of flue gas to reduce a solvent loss.

BRIEF DESCRIPTION

In accordance with one exemplary embodiment, a method for treatment of a flue gas is disclosed. The method involves feeding the flue gas and a lean solvent to an absorber. The method further involves reacting the flue gas with the lean solvent within the absorber to generate a clean flue gas and a rich solvent. The method also involves feeding the clean flue gas from the absorber and water from a source, to a wash tower to separate a stripped portion of the lean solvent from the clean flue gas to generate a washed clean flue gas and a mixture of the water and the stripped portion of the lean solvent. The method further involves treating at least a portion of the mixture of the water and the stripped portion of the lean solvent via a separation system to separate the water from the stripped portion of the lean solvent.

In accordance with another exemplary embodiment, a system for treatment of a flue gas is disclosed. The system includes an absorber for receiving a flue gas and configured to react the flue gas with a lean solvent to generate a clean flue gas and a rich solvent. The system further includes a wash tower coupled to the absorber and a source, for receiving the clean flue gas and water respectively and configured to separate a stripped portion of the lean solvent from the clean flue gas to generate a washed clean flue gas and a mixture of the water and the stripped portion of the lean solvent. The system further includes a separation system coupled to the wash tower and configured to treat at least a portion of the mixture of the water and the stripped portion of the lean solvent to separate the water from the stripped portion of the lean solvent.

DRAWINGS

Figure 2:
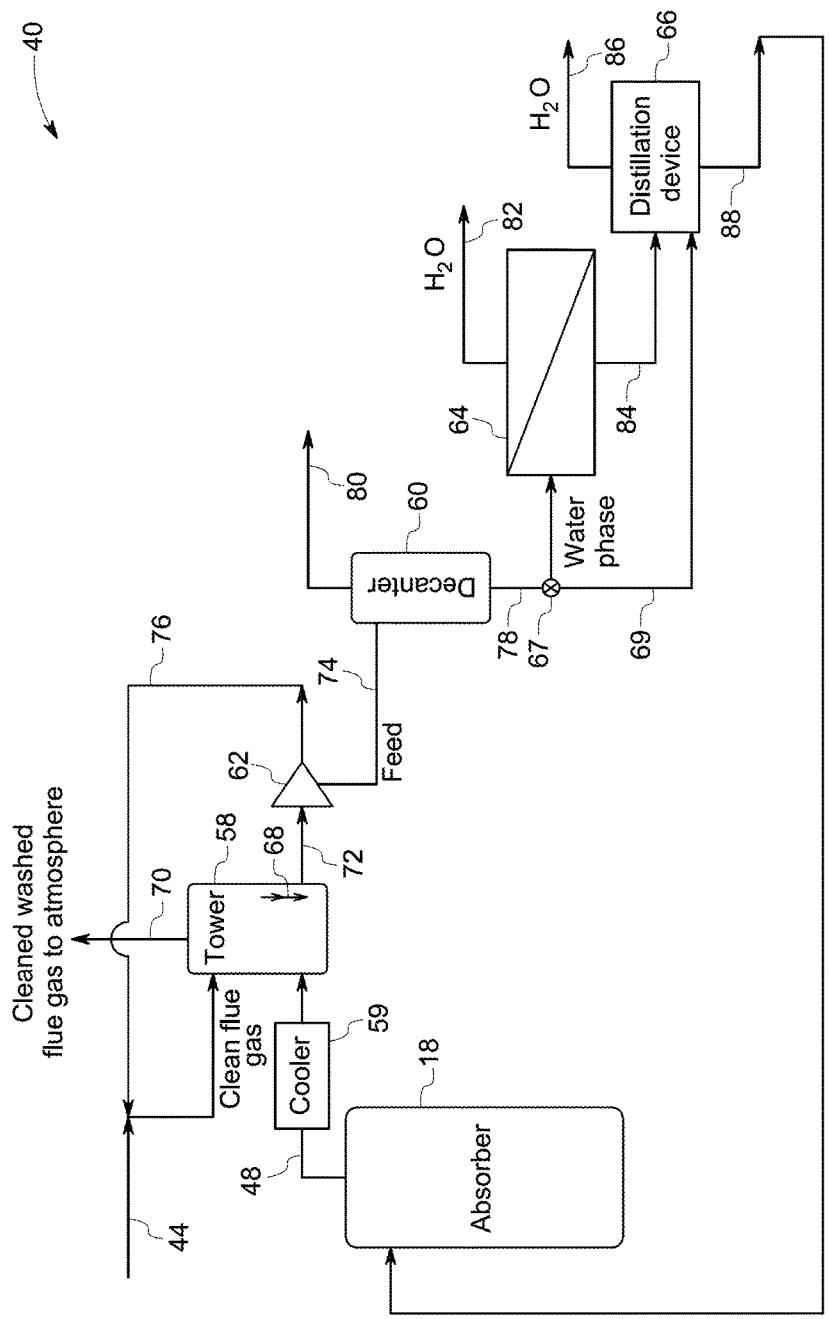

These and other features, aspects, and advantages of the present invention will become better understood when the following detailed description is read with reference to the accompanying drawings in which like characters represent like parts throughout the drawings, wherein:

FIG. 1 is a schematic block diagram illustrating a system for treatment of a flue gas in accordance with an exemplary embodiment; and FIG. 2 is a schematic block diagram illustrating an absorber coupled to a separation system in accordance with an exemplary embodiment.

DETAILED DESCRIPTION

In accordance with certain embodiments of the present invention, a method for treatment of a flue gas is disclosed. The method further involves feeding a flue gas and a lean solvent to an absorber and reacting the flue gas with the lean solvent within the absorber to generate a clean flue gas and a rich solvent. The method also involves feeding the clean flue gas from the absorber and water from a source, to a wash tower to separate a stripped portion of the lean solvent from the clean flue gas to generate a washed clean flue gas and a mixture of the water and the stripped portion of the lean solvent. The method further involves treating at least a portion of the mixture of the water and the stripped portion of the lean solvent via a separation system to separate the water from the stripped portion of the lean solvent. In accordance with certain other embodiments, a system for treatment of a flue gas is disclosed. The lean solvent is removed from the cleaned flue gas and recirculated back for further use in the treatment of the flue gas.

Referring to FIG. 1, a schematic block diagram illustrating a system 10 for treatment of a flue gas 12 in accordance with an exemplary embodiment is illustrated. The system 10 includes a cooler 14, for example, a direct contact cooler, coupled to an absorber 18. The absorber 18 is coupled via a pump 20 to a heat exchanger 22. The heat exchanger 22 is also coupled via a cooler 24 to the absorber 18. The heat exchanger 22 is further coupled to a desorber 26.

The system 10 further includes a solvent loop 28 having a pump 30 and a heater 32 coupled to the desorber 26. The desorber 26 and the solvent loop 28 together form a treatment device 29. The desorber 26 is further coupled to a separator 34 via a cooler 36. The separator 34 is coupled to a compressor 38, for example, a multi-stage compressor. The cooler 14 and the compressor 38 are coupled to a separation system 40. The separation system 40 is explained in greater detail with reference to subsequent figures.

During operation of the system 10, the flue gas 12 from a source such as a combustor, for example, is fed via the cooler 14 to cool the flue gas 12 to form a mixture of cooled flue gas 42 and water 44. The cooler 14 further separates the flue gas 42 from the water 44. The flue gas 42 and a lean solvent 46 are fed to the absorber 18. The flue gas 42 and the lean solvent 46 react (i.e. reversible chemical reaction) within the absorber 18 to generate a clean flue gas 48 and a rich solvent 50.

In one embodiment, the lean solvent 46 includes a mixture of aminosilicone and triethylene glycol. In one specific embodiment, the amino silicone is an amino propyl terminated dimethylsiloxane, wherein X (as described herein) may be from 0 to 10 or a mixture. The aminosilicones are generally referred to as GAP-X, where X is equal to the number of dimethyl siloxy repeat units. An absorbing medium from the GAP-X medium may include hindered amines such as methyldiethanolamine ("MDEA"), 2-amino-2-methyl-1-propanol ("AMP"). Optionally, the absorbing medium may also include other components, such as, for example, oxidation inhibitors, corrosion inhibitors and anti-foaming agents.

The lean solvent 46 absorbs the carbon dioxide from the flue gas 42 to generate the clean flue gas 48. The term "clean flue gas" may be referred to as a flue gas with reduced level of carbon dioxide. The term "lean solvent" may be referred to as a solvent with a substantially reduced level of carbon dioxide. The term "rich solvent" may be referred to as a solvent having an increased level of carbon dioxide. Specifically, the "rich solvent" may be referred to as a solvent having an increased level of carbon dioxide relative to the "lean solvent" as a result of absorbing the carbon dioxide from the flue gas 42. A minimal concentration difference between the rich solvent and the lean solvent may be about 1% by weight. An example of an amino silicone is represented by:

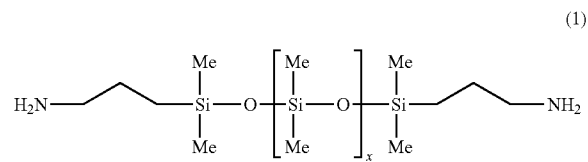

(1)

The rich solvent 50 is fed from the absorber 18 to the heat exchanger 22 via the pump 20. The rich solvent 50 is fed in heat exchange relationship with the lean solvent 46 via the heat exchanger 22. The lean solvent 46 is fed from the heat exchanger 22 via the cooler 24 to the absorber 18. The rich solvent 50 is then fed to the desorber 26. A portion of the rich solvent 50 is re-circulated via the solvent loop 28 having the pump 30 and the heater 32 to heat the portion of the rich solvent 50 and feed to the desorber 26. As a result, carbon dioxide 52 is desorbed from the rich solvent 50 to generate the lean solvent 46. The lean solvent 46 is fed via the heat exchanger 22 and the cooler 24 to the absorber 18.

Carbon dioxide 52 is cooled via the cooler 36 and then fed to the separator 34. The separator 34 separates a condensate 54 from the carbon dioxide 52. The condensate 54 is fed back to the desorber 26 and the carbon dioxide 52 is compressed within the compressor 38. A compressed carbon dioxide 56 is exhausted from the compressor 38.

The clean flue gas 48 and water from a source are fed to the separation system 40. In the illustrated embodiment, the source is the cooler 14. The water 44 is fed from the cooler 14 to the separation system 40. In another embodiment, the source is the compressor 38 and cooling water from the compressor 38 is fed to the separation system 40. In certain other embodiments, water from other sources may also be fed to the separation system 40. For example, the water may be pure water or may potentially include solvents/chemicals.

In conventional configurations, a large amount of a solvent may be lost along with a clean flue gas stream. In accordance with the embodiments discussed herein, the separation system 40 is used to separate a stripped portion of the lean solvent 46 from the clean flue gas 48 and recirculate it back to the system 10. It should be noted herein that the stripped portion of the lean solvent 46 is referred to as a removed portion of the lean solvent 46 either in the form of vapor or aerosol.

Referring to FIG. 2, a schematic block diagram illustrating the absorber 18 coupled to the separation system 40 in accordance with an exemplary embodiment is illustrated. The absorber 18 and the compressor 38 (shown in FIG. 1) are coupled to a wash tower 58. The wash tower 58 is further coupled to a decanter 60 via a flow splitter 62. The decanter 60 is coupled via a membrane separator 64 to a distillation device 66. Further, the decanter 60 is directly coupled to the distillation device 66 via a bypass valve 67 and a bypass path 69. In another embodiment, the membrane separator 64 and the distillation device 66 may not be used.

As discussed previously, during operation the clean flue gas 48 and water from a source are fed to the separation system 40. In the illustrated embodiment, the source is the cooler 14 (shown in FIG. 1). Specifically, the water 44 from the cooler 14 and the clean flue gas 48 are fed to the wash tower 58. The clean flue gas 48 is cooled via the cooler 59 before being fed to the wash tower 58. In another embodiment, the source is the compressor and cooling water from the compressor 38 is fed to the separation system 40. In certain other embodiments, water from other sources may also be fed to the separation system 40.

In the illustrated embodiment, a stripped portion 68 of the lean solvent is separated from the clean flue gas 48 within the wash tower 58, using the water 44, to generate a washed clean flue gas 70 and a mixture 72 of the water 44 and the stripped portion 68 of the lean solvent. The term "washed clean flue gas" may be referred to as a flue gas without the stripped portion of the lean solvent. Further, separating at least a portion 74 of the mixture 72 of the water 44 and the stripped portion 68 of the lean solvent is split via the splitter 62 and fed to the decanter 60. A remaining portion 76 of the mixture 72 of the water 44 and the stripped portion 68 of the lean solvent is recirculated back to the wash tower 58. In one embodiment, a portion 74 of the mixture 72 of the water 44 and the stripped portion 68 of the lean solvent includes 95% by weight of water and 5% by weight of the stripped portion 68 of the lean solvent. In other embodiments, the percentage by weight of the water 44 and the stripped portion 68 of the lean solvent may vary depending upon the application.

Further, in the illustrated embodiment, a water phase portion 78 is separated from a solvent phase portion 80 of at least the portion 74 of the mixture 72 of the water 44 and the stripped portion 68 of the lean solvent via the decanter 60, under the influence of gravity because of immiscibility of the water phase portion 78 and the solvent phase portion 80. In one embodiment, the water phase portion 78 includes about 1%-3% of the stripped portion of the lean solvent; and the solvent phase portion 80 includes about 30% water and 70% of the stripped portion of the lean solvent. In other embodiments, the percentage by weight of the water and the stripped portion of the lean solvent may vary depending upon the application.

Further, in the illustrated embodiment, a first portion 82 of the water 44 is separated from the water phase portion 78 via the membrane separator 64 to generate a first solvent portion 84. In one embodiment, the first solvent portion 84 includes 60% by weight of water and 40% by weight of the stripped portion of the lean solvent. In other embodiments, the percentage by weight of the water and the stripped portion of the lean solvent may vary depending upon the application.

A second portion 86 of the water 44 is then separated from the first solvent portion 84 via the distillation device 66 to generate a second solvent portion 88. The second solvent portion 88 is then recirculated back to the absorber 18. In another instance, if the water phase portion 78 is fed from the decanter 60 to the distillation device 66 via the bypass path 69, a portion of the water is separated from the water phase portion 78 via the distillation device 66 to generate a solvent portion.

In accordance with the embodiments of the present invention, the clean flue gas 48 is contacted with the water stream 44 in the wash tower 58. The water 44 cools the clean flue gas 48 and therefore reduces the vapor pressure of the stripped lean solvent in the clean flue gas 48. Hence, a substantial percentage of the stripped lean solvent is removed by the water 44, resulting in enhanced separation of the stripped lean solvent via the decanter 60 and the membrane separator 64

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for treatment of a flue gas, the method comprising:
    feeding the flue gas and a lean solvent to an absorber;
    reacting the flue gas with the lean solvent within the absorber to generate a clean flue gas and a rich solvent;
    feeding the clean flue gas from the absorber and water from a source, to a wash tower to separate a stripped portion of the lean solvent from the clean flue gas to generate a washed clean flue gas and a mixture of the water and the stripped portion of the lean solvent; and
    treating at least a portion of the mixture of the water and the stripped portion of the lean solvent by:
        separating a water phase portion from a solvent phase portion of at least the portion of the mixture of the water and the stripped portion of the lean solvent via a decanter within a separation system; and
        feeding the water phase portion from the decanter to a distillation device within the separation system via a bypass path; and separating at least a portion of the water from the water phase portion via the distillation device to generate a solvent portion.

2. The method of claim 1, wherein the lean solvent comprises aminosilicone.

3. The method of claim 1, wherein reacting the flue gas with the lean solvent comprises removing carbon dioxide from the flue gas, using the lean solvent.

4. The method of claim 1, further comprising separating at least the portion of the mixture of the water and the stripped portion of the lean solvent via a splitter.

5. The method of claim 1, further comprising treating the rich solvent via a treatment device to separate carbon dioxide from the rich solvent.

6. The method of claim 1, wherein treating at least a portion of the mixture of the water and the stripped portion of the lean solvent further comprises separating at least a first portion of the water from the water phase portion via a membrane separator within the separation system to generate a first solvent portion.

7. The method of claim 6, wherein treating at least a portion of the mixture of the water and the stripped portion of the lean solvent further comprises separating a second portion of the water from the first solvent portion via a distillation device within the separation system to generate a second solvent portion.

8. The method of claim 7, further comprising recirculating the second solvent portion to the absorber.

* * * * *